United States Patent [19]

Kure

[11] Patent Number: 5,014,791
[45] Date of Patent: May 14, 1991

[54] LAWN AERATOR

[76] Inventor: William L. Kure, 401 E. Monte Cristo, Phoenix, Ariz. 85022

[21] Appl. No.: 495,604

[22] Filed: Mar. 19, 1990

[51] Int. Cl.5 ............................................. A01B 1/24
[52] U.S. Cl. ..................................... 172/21; 172/354; 172/554; 172/611
[58] Field of Search .................... 172/21, 22, 349, 351, 172/354, 540, 554, 611

[56] References Cited

U.S. PATENT DOCUMENTS

| 555,623 | 3/1896 | Shailer et al. | 172/349 X |
|---|---|---|---|
| 957,573 | 5/1910 | Piggott | 172/349 X |
| 1,211,811 | 1/1917 | Bailey | 172/611 X |
| 1,704,333 | 3/1929 | McClelland | 172/611 X |
| 1,807,182 | 5/1931 | Stoner | 172/349 X |
| 1,866,998 | 7/1932 | Buel | 172/21 |

FOREIGN PATENT DOCUMENTS 910549 2/1946 France ............................... 172/349

Primary Examiner—Dennis L. Taylor
Assistant Examiner—Jeffrey L. Thompson
Attorney, Agent, or Firm—David G. Rosenbaum

[57] ABSTRACT

There is disclosed a manually powered aeration device having a frame and a removable weight tank which is positioned such that the center of gravity of the weight tank and the aerator cylidner are in substantially vertical alignment.

20 Claims, 2 Drawing Sheets

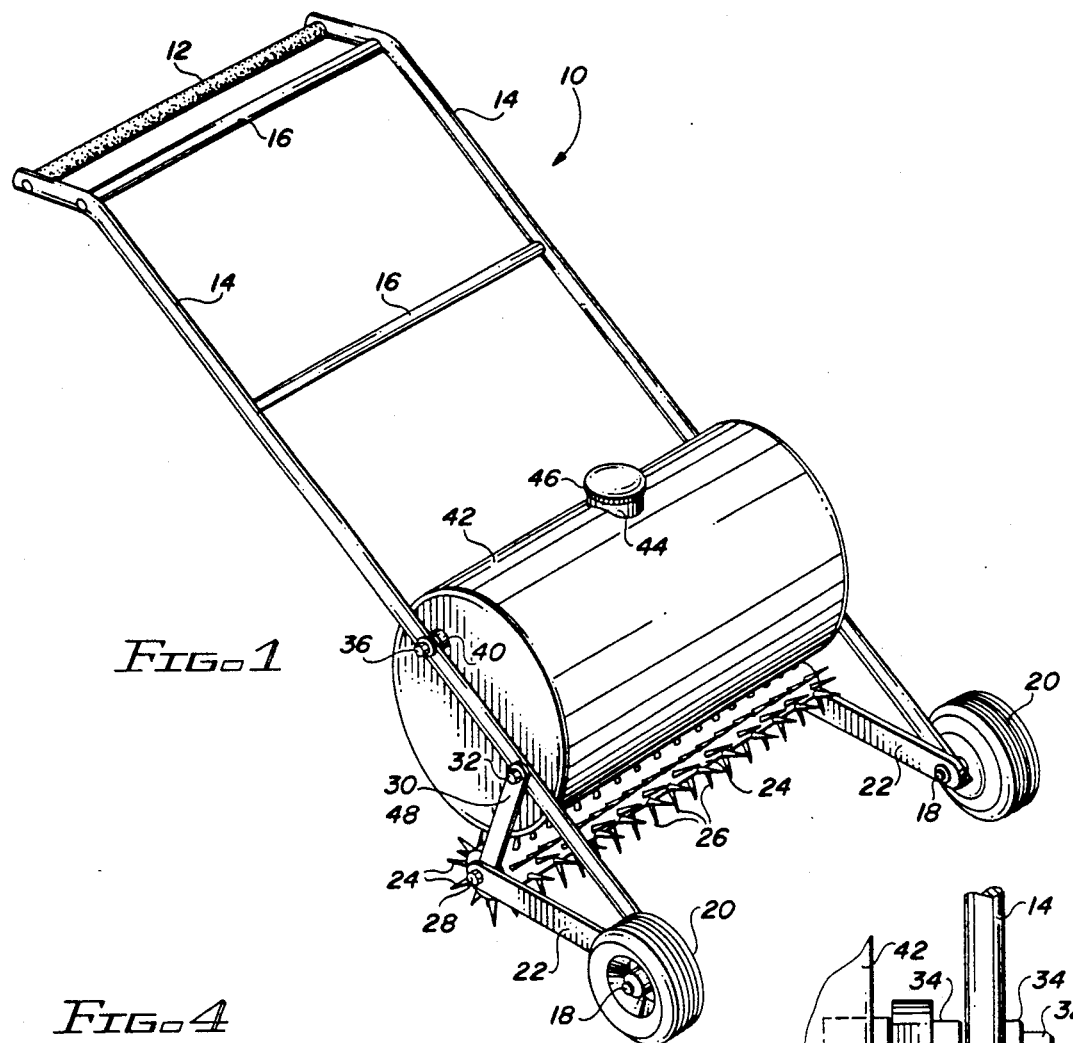
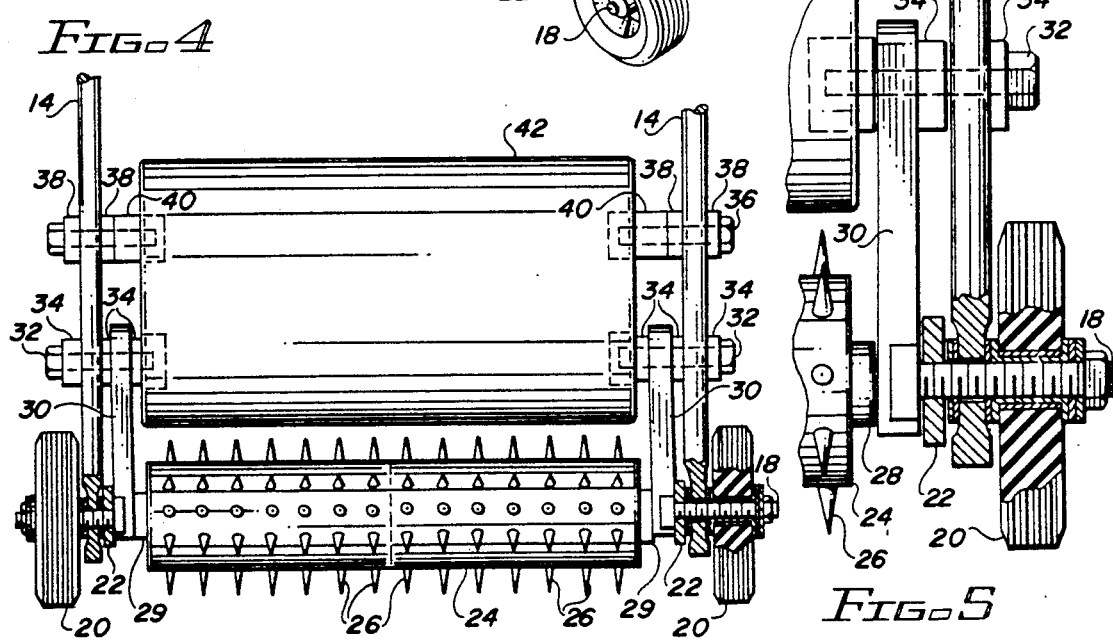
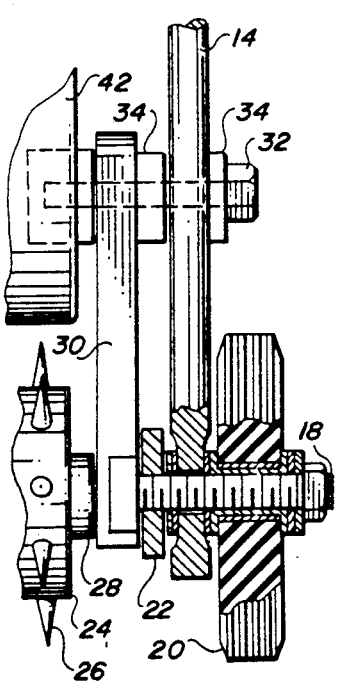

LAWN AERATOR

BACKGROUND OF THE INVENTION

1. Field of the Invention

This invention relates to lawn aerating devices, particularly those lawn aerating devices of the type which are manually propelled about the lawn to penetrate the lawn surface thereby increasing the amount of oxygen available in the underlying soil and facilitating soil fluid retention.

2. Description of the Prior Art

Tyson U.S. Pat. No. 1,217,245, issued Feb. 27, 1917, shows a turf ventilator with a forked handle having a large rolling cylinder disposed between the ends of the handle. A rack of aeration blades is pivotally coupled to the cylinder axle and trails the cylinder. Depth of penetration is controlled by a bar with an adjustable counterweight weight extending over the rack.

Fitts U.S. Pat. No. 1,802,711, issued Apr. 28, 1931, shows a surface cutter and cultivator with pivotally connected, opposing forked handles and a large central aeration cylinder having mounted shoes with projecting spikes. The weight of the cylinder controls the depth of penetration.

Buel U.S. Pat. No. 1,866,998, issued July 12, 1932, shows a turf roller having a large aerator cylinder disposed at the end of frame members and a wheel which is cross-braced to the frame. The weight of the cylinder controls the depth of penetration.

Richards U.S. Pat. No. 1,898,214, issued Feb. 21, 1933, shows a lawn aerator having a forked frame with an aeration cylinder horizontally disposed between the frame members. The cylinder can be filled with sand or water to control the depth of penetration.

Allen U.S. Pat. No. 1,955,937, issued Apr. 24, 1934, shows a spiked roller having a leading aerator cylinder, with a pair of large wheels positioned on lateral sides of the cylinder, and a trailing roller. The weight of the cylinder controls the depth of penetration.

Logan U.S. Pat. No. 3,171,498, issued Mar. 2, 1965, shows a aerating apparatus with a forked frame with drums disposed between the frame members. A series of spikes rotate with the drums and the entire apparatus is meant to be towed behind a vehicle. The drums can be filled with water to control the depth of penetration.

Angeski U.S. Pat. No. 3,881,553, issued May 6, 1975, shows a lawn aerating and dressing apparatus having a frame with a drum disposed between the frame members. The hollow drum has spiked pluggers that lift plugs of soil into the drum. Rotation of the drum breaks the soil into small particles for distribution over the lawn. The apparatus has leading wheels that pivot to facilitate transportation when not in use.

Clements U.S. Pat. No. 4,158,391, issued June 19, 1979, shows a soil aerating device having a hollow drum with hollow coring elements extending radially from the drum. A weighted drum or other receptacle provides cantilever force to control the depth of penetration. The apparatus is meant to be pulled behind a vehicle.

Gorbett U.S. Pat. No. 4,619,329, issued Oct. 28, 1986, shows a soil aerator having a hollow drum, with knife-like projections, which rolls directly on the soil surface. The apparatus is meant to be pulled behind a vehicle.

None of the foregoing patents teach the axial alignment of the frame member and the wheels with a trailing aerator, wherein a removable weight tank is positioned such that the center of gravity of the drum and of the aerator cylinder are vertically aligned. Of the manually operated aerators, none use a drum or tank capable of being filled with water or sand that is separate from the aerator cylinder, thereby permitting easy storage and transport of the lawn aerator when not in use. The aerators designed to be pulled behind a vehicle are bulky and incapable of efficient use on the typical small lawn.

There exists a need for a lightweight, relatively small, and easily portable lawn aerator capable of use on typical household and other small lawns.

SUMMARY OF THE INVENTION

The invention provides a lawn aerator designed to be pushed about the lawn to aerate the soil without damaging the existing vegetation or ground cover. It is the object of this invention to provide such a lawn aerator that is lightweight, relatively small, and easily portable for use by the typical homeowner or lawn maintenance person.

Preferably, the invention comprises a lightweight frame with a handle and appropriate cross braces to provide a sufficiently rigid system. The lower end of the frame should have axle extensions protruding from the frame members appropriate for rotatively mounting wheels. A plurality of side brackets should extend downward from, and be attached to, the frame. The lower end of the side brackets should operatively connect to the aerator cylinder such that the cylinder can rotate freely as the lawn aerator is pushed across the lawn. A substantially horizontal brace interconnects the axle extensions and the aerator cylinder. A lightweight hollow drum capable of being filled with sand or water to control the depth of aeration is removably attached to the frame such that the center of gravity of the drum and of the aerator cylinder are substantially vertically aligned. When not in use, the drum is removed, the horizontal brace is disconnected from the aerator cylinder, the cylinder is rotated forward, and the frame is collapsed.

The aerator cylinder described above should have aerating pegs extending radially from the aerator cylinder capable of penetrating any lawn cover and sufficiently stiff to prevent breakage. The placement of the pegs around the aerator cylinder circumference is such that even and complete aeration is obtained during each pass of the lawn aerator.

BRIEF DESCRIPTION OF THE DRAWINGS

FIG. 1 is a perspective view of a lawn aerator in accordance with the invention;

FIG. 4 is an enlarged partial front view taken generally along line 4—4 in FIG. 2;

FIG. 5 is an enlarged fragmentary partial front view similar to FIG. 4 illustrating a means for mounting the wheel members;

DESCRIPTION OF THE PREFERRED EMBODIMENTS

Figure 2:
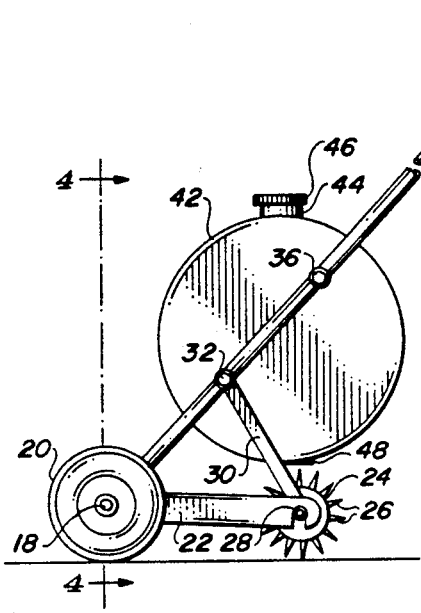
FIG. 2 is a side view of the invention shown in FIG. 1 showing the substantial coaxial relationship between the center of gravity of the drum and of the aerator cylinder.

One embodiment of the invention, designated generally 10, is illustrated in FIGS. 1-5. The invention includes a substantially planar frame comprised of at least one of a plurality of frame member 14, a handle 12, and at least one cross brace member 16. The frame member 14, handle 12, and cross brace member 16 are made of lightweight, strong, and corrosion resistant materials suitable for the intended usage. The frame member 14, as shown in FIG. 1, can comprise an open rectilinear structure which is collapsible to facilitate easy storage and transfer of the lawn aerator 10.

Figure 7:
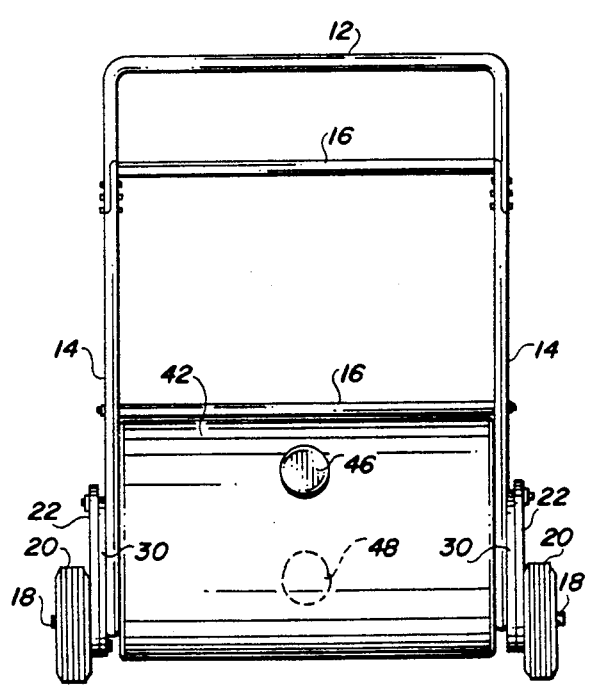
FIG. 7 is a front view of the embodiment shown in FIG. 6.

At a lower end of the frame member 14 is a mounting means consisting of at least one of a plurality of axle extensions 18, as shown in FIG. 5, or at least one axle 19 extending between the frame member 14, as shown in FIG. 7, suitable for rotatively mounting at least one of a plurality of wheel members 20 and securing the wheel members by appropriate means, such as a nut. The axle extensions 18 or the axle 19 are made of lightweight, strong, and corrosion resistant materials and the wheel members 20 are made of solid rubber.

Figure 3:
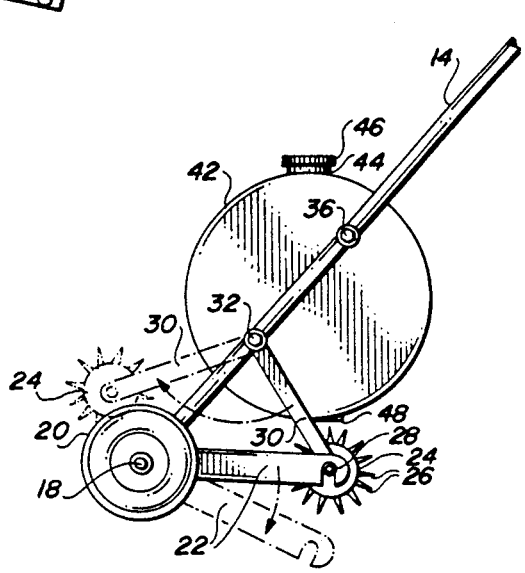
FIG. 3 is partial side view similar to FIG. 2 illustrating the removal of the horizontal brace permitting the aerator cylinder to swing forward for transport or storage.

Extending downward from, and attached to, the frame member 14 has at least one of a plurality of bracket members 30. The bracket members 30 connect with the aerator cylinder axle 28, which extends centrally from the longitudinal axis of an aerator cylinder 24, using a suitable connecting means such as a nut. At least one of a plurality of substantially horizontal brace members 22 extend rearward from the axle extensions 18 or axle 19 to connect with the aerator cylinder axle 28 using an easily removable connecting means such as a wing nut. As shown in FIG. 3, the brace members 22 have slots suitable for permitting the brace members 22 to be lifted off the aerator cylinder axle 28 to allow the aerator cylinder 24 to be pivoted forward, thereby facilitating easy transport of the lawn aerator 10 when not in use. The brace members 22 and the bracket members 30 are made of lightweight, strong, and corrosion resistant materials.

The aerator cylinder 24 has a plurality of aerating pegs 26 extending radially from the cylinder 24 which are suitably sized and spaced for effectively aerating a lawn while not damaging the existing vegetation, as is well known within the art. The aerator cylinder 24 is freely rotatable about its longitudinal axis, permitting the lawn aerator 10 to aerate while being pushed across the lawn. The aerator cylinder 24, aerator cylinder axle 28, and aerating pegs 26 are made of lightweight, strong, and corrosion resistant materials. The aerating pegs 26 are shaped to prevent damage to existing vegetation or ground cover and designed not to be easily broken off during use.

A hollow drum 42, made of a lightweight and corrosion resistant material such as fiberglass or plastic, is removably mounted on the frame member 14 by a plurality of connections consisting of a lower 32 and upper 36 connector assembly. The lower assembly 32, shown in detail in FIG. 5, consists of a bolt-like device which protrudes into a recess located in the ends of the drum 42. The drum 42, bracket members 30, and frame member 14 are separated by at least one spacer 34. The lower assembly 32 has a large head, suitable for easily unscrewing the bolt, facilitating removal of the drum 42.

The upper assembly 36, shown in FIG. 4, also consists of a large head bolt-like device to facilitate removal of the drum 42. The bolt-like device engages bolt receptacles 40 which protrude from the ends of the drum 42. At least one spacer 38 separates the bolt receptacle 40 from the frame member 14.

FIGS. 1-3 show the drum with at least one sealable opening 44 with a screw-on cap 46, or other suitable means for closing the opening 44. The sealable openings 44 allow the user to fill the drum 42 with water, sand, or other weighting material sufficient to achieve the depth of aeration desired. A center of gravity of the drum 42 is substantially vertically in-line with a center of gravity of the aerator cylinder 24 which provides a beneficial geometric arrangement for transferring the weight of the filled drum 42 to the aerator cylinder 24.

At least one flange 48, suitable for providing additional support for the drum 42, extends between and connects to the bracket members 30 or the frame member 14. The flange is made of a lightweight, strong, and corrosion resistant material.

Another embodiment of the invention comprises at least two interconnected cylinder segments permitting both cylinder segments to freely rotate as the lawn aerator 10 is pushed across the lawn. A plurality of braces 22 interconnect the mounting means, such as the axle extensions 18, with the aerator cylinder axle 28. A bracket 30 extends vertically above the interconnected cylinder segments and attaches to a flange 48 extending between frame member 14. The hollow drum 42 is removably attached to the flange 48.

Figure 6:
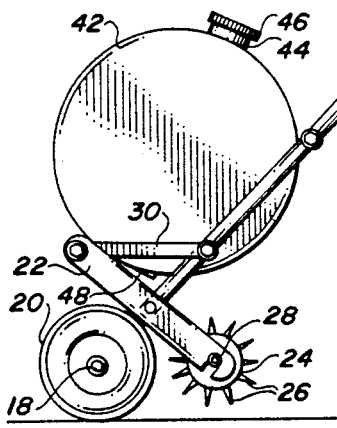
FIG. 6 is a side view of another embodiment of the invention.

Another embodiment of the invention is shown in FIGS. 6 and 7 and comprises a substantially planar frame with at least one of a plurality of frame member 14, a handle 12, and at least one cross brace member 16. At least one of a plurality of bracket members 30, attached to the frame member 14, extend forward of the frame. Attached to the forward end of the bracket members 30 are at least one of a plurality of brace members 22 which extend substantially perpendicular to, and connecting with, the frame member 14. A rearward end of the brace members 22 connect with an aerator cylinder axle 28 below the frame member 14. The geometric combination of the brace members 22 and the bracket members 30 form a cradle which supports a hollow drum 42 in a position such that a center of gravity of the hollow drum 42 is substantially vertically aligned with a center of gravity of the aerator cylinder 24.

While the invention has been shown in several of its alternative forms, it is not thus limited, but is susceptible to various modifications in design and materials without departing from the scope of the invention.

What is claimed is:

1. A lawn aerator, comprising:
   at least one frame member forming a substantially planar frame;
   at least one bracket member extending downward from, and attached to, said substantially planar frame;
   mounting means for rotatively mounting at least one wheel member on a lower end of said substantially planar frame;
   at least one aerator cylinder having a plurality of aerating pegs extending radially from said cylinder, said cylinder being rotatable about its longitudinal axis and operatively connected to said at least one bracket member;

at least one substantially horizontal brace member interconnecting said mounting means with said aerator cylinder;

a hollow drum;

at least one flange connected to said at least one bracket member, said at least one flange supporting said hollow drum; and drum mounting means, associated with said substantially planar frame, for removably mounting said hollow drum to said substantially planar frame above said aerator cylinder.

2. A lawn aerator according to claim 1, wherein said mounting means comprises at least one axle.

3. A lawn aerator according to claim 1, wherein said mounting means comprises at least one axle extension.

4. A lawn aerator according to claim 1, wherein said substantially planar frame further comprises a handle and at least one cross brace member, and is collapsible.

5. A lawn aerator according to claim 1, wherein said hollow drum includes at least one sealable opening for filling and emptying said hollow drum.

6. A lawn aerator according to claim 1, wherein a center of gravity of said hollow drum and of said aerator cylinder are substantially vertically aligned.

7. A lawn aerator according to claim 1, wherein said apparatus further comprises at least one flange connected to said substantially planar frame, wherein said drum mounting means removably mounts said hollow drum to said at least one flange.

8. A lawn aerator according to claim 1, wherein said drum mounting means removably mounts said hollow drum to said at least one flange.

9. A lawn aerator according to claim 8, wherein said at least one substantially horizontal brace member interconnects said at least one flange with said mounting means.

10. A lawn aerator according to claim 1, wherein said at least one frame member further comprises an open rectilinear structure.

11. A lawn aerator according to claim 10, wherein said apparatus further comprises at least one flange connected to said at least one frame member, said hollow drum being removably mounted on said at least one flange.

12. A lawn aerator according to claim 10, wherein said apparatus further comprises at least one flange connected to said at least one bracket member, said hollow drum being removably mounted on said at least one flange.

13. A lawn aerator according to claim 12, wherein said at least one substantially horizontal brace member interconnects said at least one flange with said mounting means.

14. A lawn aerator according to claim 1, wherein said aerator cylinder consists of at least two interconnected cylinder segments.

15. A lawn aerator according to claim 1, wherein said drum mounting means comprises an upper and lower assembly comprising a female connector receptacle attached to said hollow drum, a spacer element, and a removably bolt member, wherein said lower connector assembly further connects said hollow drum and said substantially planar frame to said bracket member.

16. A lawn aerator, comprising:

at least one frame member forming an open rectilinear frame further comprising a handle and at least one cross brace member;

at least one bracket member extending downward from, and attached to, said open rectilinear frame;

mounting means comprising at least one axle for rotatively mounting at least one wheel member on a lower end of said open rectilinear frame;

an aerator cylinder comprising one or more interconnected cylinder segments having a plurality of aerating pegs extending radially from said one or more interconnected cylinder segments, said aerator cylinder rotatable about its longitudinal axis and operatively connected to said at least one bracket member;

at least one substantially horizontal brace member interconnecting said mounting means with said aerator cylinder;

at least one flange connected to said at least one bracket member, wherein said at least one bracket member interconnects said at least one flange with said one or more interconnected cylinder segments; and a hollow drum, with at least one sealable opening, removably mounted above said aerator cylinder on said at least one flange such that a center of gravity of said hollow drum and of said aerator cylinder are substantially vertically aligned.

17. A lawn aerator according to claim 16, wherein said open rectilinear frame is collapsible.

18. A lawn aerator according to claim 16, wherein said at least one substantially horizontal brace member interconnects said mounting means with said one or more interconnected cylinder segments.

19. A lawn aerator, comprising:

at least one frame member forming a substantially planar frame;

at least one bracket member extending forward of, and attached to, said substantially planar frame;

at least one brace member substantially perpendicular to, and attached to, said substantially planar frame, a forward end of said at least one brace member attached to said at least one bracket member;

an aerator cylinder having a plurality of aerating pegs extending radially from said cylinder, said cylinder rotatable about its longitudinal axis and operatively connected to a rearward end of said at least one brace member;

mounting means for relatively mounting at least one wheel member on a lower end of said substantially planar frame; and a hollow drum removably mounted on said substantially planar frame.

20. A lawn aerator according to claim 19, wherein a center of gravity of said hollow drum and of said aerator cylinder are substantially vertically aligned.

* * * * *

UNITED STATES PATENT AND TRADEMARK OFFICE
CERTIFICATE OF CORRECTION

PATENT NO. : 5,014,791
DATED : May 14, 1991
INVENTOR(S) : William L. Kure

It is certified that error appears in the above—identified patent and that said Letters Patent is hereby corrected as shown below:

Column 5, Claim 15, line 61, delete "removably", insert therefor --removable--;

Column 6, Claim 19, line 53, delete "relatively", insert therefor --rotatively--.

Signed and Sealed this

First Day of September, 1992

Attest:

DOUGLAS B. COMER

Attesting Officer     Acting Commissioner of Patents and Trademarks